(12) United States Patent
Witt et al.

(10) Patent No.: US 7,334,099 B2
(45) Date of Patent: *Feb. 19, 2008

(54) METHOD AND SYSTEM FOR MANAGING IMAGE FILES

(75) Inventors: Wesley A. Witt, Redmond, WA (US); Sara J. Schumacher, Montreal (CA); Kartik N. Raghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

This patent is subject to a terminal disclaimer.

(21) Appl. No.: 10/184,257

(22) Filed: Jun. 28, 2002

(65) Prior Publication Data

US 2004/0003103 A1 Jan. 1, 2004

(51) Int. Cl.
*G06F 12/00* (2006.01)
*G06F 12/16* (2006.01)
*G06F 17/30* (2006.01)
*G06F 13/10* (2006.01)

(52) U.S. Cl. ............... 711/162; 711/161; 707/200; 707/202; 707/204

(58) Field of Classification Search ........ 707/200, 707/202, 204; 711/162, 161
See application file for complete search history.

(56) References Cited

U.S. PATENT DOCUMENTS

| | | | |
|---|---|---|---|
| 5,276,860 A | 1/1994 | Fortier, et al. | |
| 5,818,723 A | 10/1998 | Dimitri | |
| 5,930,828 A | 7/1999 | Jensen, et al. | |
| 5,960,460 A | 9/1999 | Marasco, et al. | |
| 5,966,730 A | 10/1999 | Zulch | |
| 5,991,542 A * | 11/1999 | Han et al. | 717/167 |
| 6,108,697 A | 8/2000 | Raymond, et al. | |
| 6,205,527 B1 | 3/2001 | Goshey, et al. | |
| 6,330,653 B1 * | 12/2001 | Murray et al. | 711/173 |
| 6,424,999 B1 | 7/2002 | Arnon, et al. | |
| 6,477,624 B1 * | 11/2002 | Kedem et al. | 711/147 |
| 6,477,629 B1 | 11/2002 | Goshey, et al. | |
| 6,505,216 B1 * | 1/2003 | Schutzman et al. | 707/204 |
| 6,546,500 B1 | 4/2003 | Miyamoto | |
| 6,658,436 B2 | 12/2003 | Oshinsky, et al. | |
| 6,684,229 B1 | 1/2004 | Luong, et al. | |
| 6,718,446 B1 * | 4/2004 | Peters et al. | 711/162 |
| 6,948,039 B2 * | 9/2005 | Biessener et al. | 711/162 |
| 7,185,169 B2 * | 2/2007 | Biessener et al. | 711/202 |
| 2002/0031223 A1 | 3/2002 | Knighton, et al. | |
| 2002/0135801 A1 | 9/2002 | Tessman, Jr. et al. | |
| 2003/0163809 A1 * | 8/2003 | Bantz et al. | 717/177 |

* cited by examiner

*Primary Examiner*—Li B. Zhen
(74) *Attorney, Agent, or Firm*—Lee & Hayes, PLLC

(57) ABSTRACT

A method and system for managing image files is provided. The image files include a plurality of streams such as a control stream, a data stream, a bitmap stream, and a cluster map stream. An audit trail stream, properties stream and fix-up stream may also be provided. An image driver translates requests from the operating system so that the image can be read, edited or otherwise manipulated.

15 Claims, 10 Drawing Sheets

METHOD AND SYSTEM FOR MANAGING IMAGE FILES

CROSS-REFERENCE TO RELATED APPLICATIONS

This application is related to co-pending application entitled "Method and System for Creating and Restoring an Image File" filed by Wesley Will and Edward Miller on Jun. 28, 2002, having application Ser. No. 10/185,755, which document is hereby expressly incorporated by reference.

TECHNICAL FIELD

This invention relates to computer systems and generally to image files. More particularly this invention relates to managing image files.

BACKGROUND OF THE INVENTION

Computer systems interface to one or more storage media. The storage media stores a variety of data such as operating system files, application programs and data files used with application programs. Known storage media types include hard disks, CD ROMs, Digital Versatile Disk (DVD) and the like. The storage media is logically subdivided into one or more volumes or partitions. The storage media is further physically subdivided into a plurality of sectors. Each sector is capable of storing a plurality of bytes of data. A cluster is a group of sectors and represents the smallest unit that an operating system executing in the computer uses to identify locations on the storage media. Thus, the operating system typically stores or reads data on the storage media on a cluster by cluster basis.

The data on the storage media is organized as a set of files and other control information used to manage the files on the disk. For example, each operating system file, application program or data file represents a different file on the storage media. The control information identifies the clusters on the storage media that include data for each file. The control information also identifies the clusters on the storage media that are allocated, i.e. include data for a file, and the clusters that remain unallocated, i.e. are available to store new data. The control information itself is stored as part of one or more files. The precise manner that the files and control information are organized on the storage media depends upon a file system. Various known file systems exist, such as File Allocation Table 16 (FAT16), File Allocation Table 32 (FAT32) and New Technology File System (NTFS).

An image file is a copy of the data stored on a source storage media volume. Typically, the image file is a single stream of data that is a sector by sector copy of the data contained on the source storage media volume. The image file is in turn stored on a destination storage media volume. The destination storage media volume is a different volume or partition on the same storage media or, alternatively, a separate storage media. For example, an image file that represents a sector by sector copy of a hard disk volume is stored on a CD ROM.

The image file is used for at least two functions. First, the image file is used to restore the source storage media volume to its state at the time the image file was created. Thus, the image file can be used to restore the storage media volume if it becomes damaged or corrupted. Second, the image file is used to provide a plurality of computer systems with the same basic configuration.

Because the image file is created as a sector by sector copy of the source storage media, and is stored as single data stream, it is difficult to manipulate the image file. The operating system cannot readily read the control information or individual file data from the data stream. As a result, files in the data stream cannot be replaced with new files or edited. In order to update an image file, it is necessary to restore the image file to a storage media volume, perform updates to the storage media volume, and then create a new image file. Also, if a user or system administrator wants to maintain different versions of an image file, separate image files must be created for each different version. Thus, known methods of maintaining image files are resource intensive and costly.

SUMMARY OF THE INVENTION

In accordance with the foregoing, a method and system for managing image files is provided. The image file is created from source data on a source storage media volume. The image file is stored on a destination storage media volume interfaced to the same computer or a different computer that is preferably in communication via a network such as a LAN, WAN or the Internet. The image file includes a plurality of image streams. The image streams include a control stream, a data stream, a bitmap stream, and a cluster map stream. Other image streams such as an audit trail stream, a properties stream and a fix-up stream are optionally included in the image file.

The control stream forms a header for the image file that uniquely identifies the image file. The control stream also includes data that identifies the source storage media volume, such as data that identifies source storage media volume geometry, and an operating system stored on the source storage media. The control stream provides information needed to read, restore, edit or otherwise manipulate the image file.

The data stream includes data for each of a plurality of files on the source storage media volume. The data stream also includes control information from the source storage media volume. The data in the data stream is optionally compressed or encrypted. In an embodiment of the invention, the data in the data stream is defragmented when the image file is created.

The bitmap stream identifies clusters on the source storage media that are allocated to a file and the clusters that remain unallocated. The bitmap stream facilitates editing of the image file by providing a fast lookup allowing the operating system to identify locations on the source storage media available to store new data.

The cluster map stream correlates the location of a group of data on the source storage media to its location in the data stream. Optional image file streams such as the property stream and audit trail stream identify the types of files located in the image file and identify edits made to the image file.

An image driver provides an interface that allows the operating system to access the image file. The image driver converts access requests that include a virtual cluster location into a data stream location. The image driver permits the operating system to read the image file as if it were a separately addressable storage media volume.

The image driver permits editing of the image file. When the image driver receives a request to write data to the image file, the image driver writes the data to the end of the data stream. The image driver updates the cluster map stream by providing a cluster map record that correlates a virtual cluster location to a data stream location.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
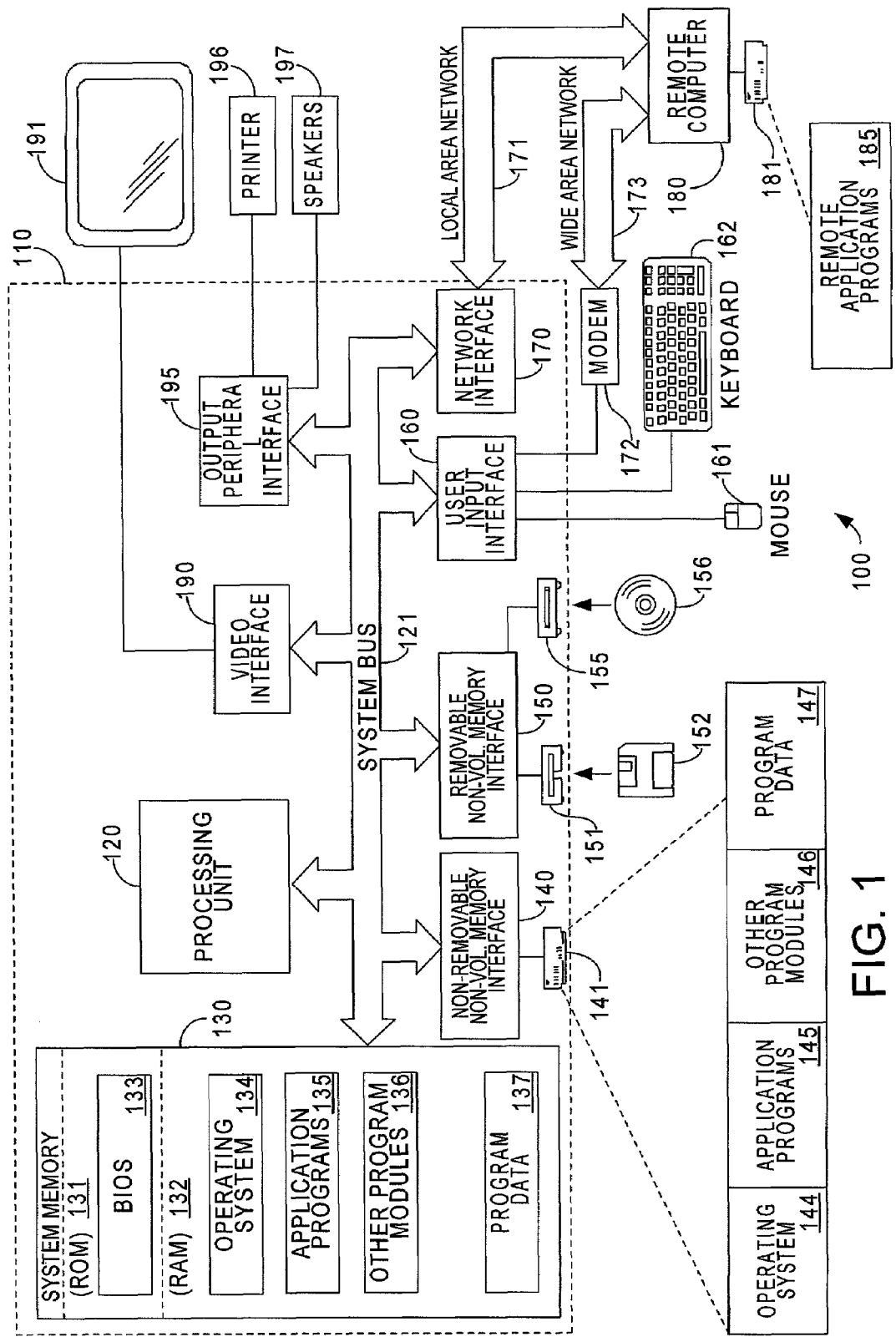
FIG. 1 is a block diagram generally illustrating an exemplary computer system on which the present invention resides.

The invention is directed to a method and system for managing image files. An image file includes a copy of data stored on a source storage media volume. The types of data stored on the source storage media volume typically includes operating system files, application programs, data files and other control information used to manage the data stored on the volume. In the present invention, the image file comprises a plurality of streams including a control stream, a data stream, a bitmap stream, a fix-up stream and a cluster map stream. Optional streams such as a property stream and audit trail may be included in the image file.

The data stream of the image file includes the data copied from the source storage media volume. The control stream, bitmap stream, and cluster map stream include information needed to manage data in the data stream. The image file is accessed by a mount process that provides the image file with a virtual storage media reference. After the image file is mounted, the operating system accesses data within the data stream by referencing virtual clusters. The cluster map stream is used to convert the virtual clusters into locations within the data stream. The invention allows the operating system to access the image file as if it were a storage media volume such as a disk drive. For example, files stored in the data stream can be viewed, edited, created or deleted.

In an embodiment of the invention, multiple versions of a source storage media volume are stored in one or more image files. A first image file, referred to as the parent image file, is created of the source storage media volume at a first period of time. A second image file, referred to as the child image file, is created of the source storage media volume at a second period of time. The child image file only includes data from the source storage media volume that has changed since the first period of time. The first and second image files are stored as separate files. Alternatively, the first and second image file are stored as part of single image file. The first and second image files allows a destination storage media volume to be provided with the data from the source storage media volume at either the first or second period of time.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
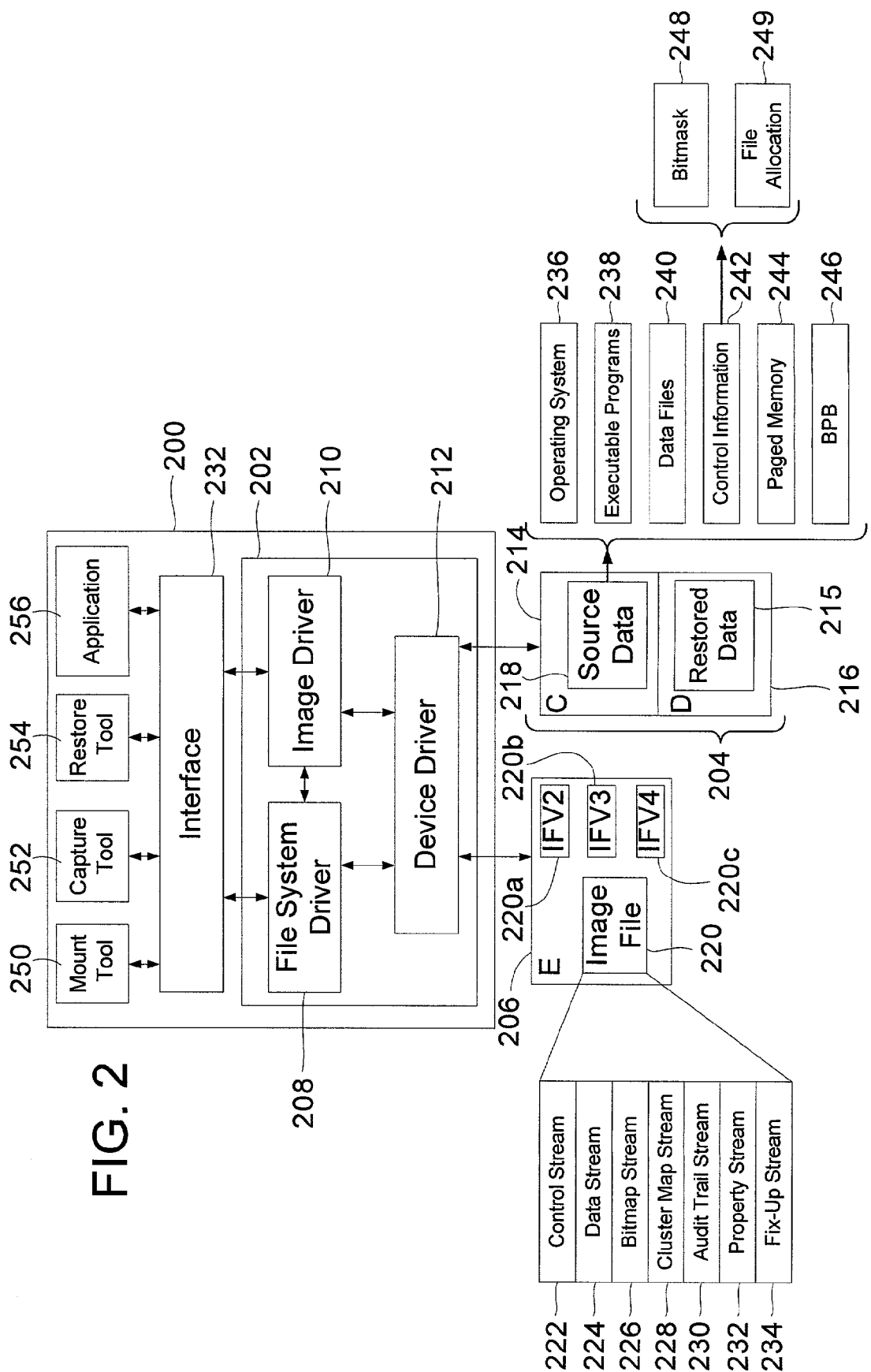
FIG. 2 is a block diagram of an operating environment used to create, restore and edit the image file.

FIG. 2 illustrates an exemplary operating arrangement embodying the present invention. The operating arrangement includes a computer 200 interfaced to source storage media 204 and destination storage media 206. An operating system 202 executes within the computer 200. The operating system 202 includes components such as file system driver 208, image driver 210, and device driver 212 that facilitate communication between the computer 200 and the storage media 204 and 206.

Each storage media is logically divided into one or more volumes. Storage media 204 is divided into a first volume 214 and a second volume 216. Storage media 206 is divided into a single volume. Each storage media volume is accessible by the operating system 202.

The storage media 204 and 206 each include a geometry. The geometry of the storage media includes a number of cylinders, tracks per cylinder, and sectors per track. A sector is a physical unit on the storage media. Each sector is capable of storing a certain amount of information, for example, 512 bytes. The geometry of each storage media 204 and 206 need not be the same.

A cluster is a group of one or more sectors. The operating system 202, and more particularly the file system driver 208, sends read and write requests to the device driver by identifying cluster numbers. A file system determines the number of sectors that comprise a cluster. Various known file systems exist such as File Allocation Table 16 (FAT16), File Allocation Table 32 (FAT32), Compact Disk File System (CDFS), and New Technology File System (NTFS).

As shown, the first volume 214 of the source storage media 204 includes source data 218. The source data 218 includes a plurality of files such as operating system files 236, executable programs 238 such as application programs, and data files 240 used with the application programs. The source data 218 also includes control information 242. The control information includes file allocation data 249 that identifies the clusters on the storage media volume 214 that include data for each file. The control information 242 also includes a bitmask 248. The bitmask 248 comprises a plurality of bits and each bit corresponds to one cluster on the storage media volume. Each bit in the bitmask has a value that identifies whether the corresponding cluster includes stored data for at least one file or whether the cluster remains unallocated.

The manner used to organize and store the control information 242 and files 236, 238, 240 depends on the file system used. By way of example, the NTFS file system stores a Master File Table (MFT) on the storage media. The MFT includes an extent list for each file stored on the storage media. The extent list includes a series of entries that identify a starting block and length. The starting block and length define a series of contiguous clusters that include data for the file.

Other information included as part of the source data 218 includes paged memory 244 and a BIOS Parameter Block (BPB). The paged memory 244 is a portion of the computer's memory that is written to the storage media. The BPB includes data about the storage media volume such as the size of media and the location of certain files on the storage media.

The destination storage media 206 includes an image file 220. The image file is a logical capture of information that includes source data 218. In the present invention, the image file 220 is used to restore the source data 218 to a storage media volume. For example, the image file 220 is used to create restored data 215 onto storage media volume 216. The restored data 215 includes the operating system files 236, executable programs, 238, data files 240 and control information 242 of the original source data 218. As described in more detail below, the cluster location of data in restored data 215 need not directly correspond to the cluster location of data from source data 218. For example, the source data 218 may be defragmented when the image file 220 is created. The restored data 215 can also be placed on the source volume 214 from which the image file 220 was made thereby restoring the source storage media volume 214 to a previous state.

The image file 220 is also used to place source data 218 onto storage media interfaced to a separate computer. The image file 220 can be restored onto the storage media of a remote computer via a computer network such as a LAN, WAN or the Internet. The image file 220 can also be restored to a separate computer if the image file 220 is placed on removable media such as a CD ROM or DVD disk. The removable media is interfaced to the separate computer and restored to another storage media volume interfaced to the separate computer.

The destination storage media 206 also includes image files labeled 220a, 220b, 220c. The present invention allows editing of image file 220. After the image file 220 is edited, it can be stored as a separate file such as image file 220a. Thus, multiple versions of an image file are created. In an alternative embodiment, image file 220 is a parent image file including source data 218 at a first period of time. Image files 220a, 220b, 220c are child image files made at subsequent periods of time. Each child image file 220a, 220b, 220c only includes changes made to source data 218 subsequent to the creation of the parent image file 220. Alternatively, the child image files 220a, 220b, 220c are stored as part of the image file 220 thereby creating a single image file with multiple versions of source data 218.

The image file 220 includes a plurality of image streams. As shown, the image file 220 includes a control stream 222, a data stream 224, a bitmap stream 226, a cluster map stream 228, an audit trail stream 230, and a property stream 232. The image streams are stored on the destination storage media 206 as part of the image file 220. The image file 220 also includes a fix-up stream 234. The fix-up stream 234 is a temporary stream used to adjust data in the other image streams before they are written to the image file 220. Once the data in the other streams is adjusted, the fix-up stream 234 is removed from the image file. In an embodiment of the invention, the audit trail stream 230 and properties stream 232 are optional. Image files 220a, 220b, 220c include the same image streams as image file 220.

In the embodiment shown, the destination storage media 206 and the source storage media 214 interface to the computer 200 via a common device driver 212 and file system driver 208 thereby assuming that both storage media employ a common file system and same storage media type.

As those skilled in the art will recognize, different storage media types may be used and each storage media volume may utilize different file systems. For example, storage media volume 206 is a CD ROM using the CDFS file system while storage media volume 214 is a hard disk using FAT16 or FAT32. In that case, a plurality of file system drivers 208 and device drivers 212 are typically required.

The operating arrangement includes a mount tool 250, a capture tool 252, a restore tool 254, and applications 256. Applications 256 include, for example, word processing application programs, data base programs and other system resources such as those used to manage storage media. Known resources used to manage storage media allow users to view the files on a storage media, copy files, delete files, move files, and the like. The capture tool 252 creates the image file 220 from the source data 218. The restore tool 254 creates restored data 215 from the image file 220 on a storage media volume such as the original source storage media volume 214 or separate storage media volume such as volume 216.

In an embodiment of the invention, the mount tool 250, the capture tool 252 and the restore tool 254 are implemented as stand alone applications. The tools can then be executed through a user interface, application program, other program modules or command line request. In another embodiment of the invention, the mount tool 250, the capture tool 252, and the restore tool 254 implemented as part of the user interface, application program, or other program module.

Tools 250, 252 and 254 send requests to operating system 202. Alternatively, requests from tools 250, 252, 254 are routed through an interface 232. The interface 232 provides access to information in the individual streams 222-234 in the image file 220. Thus, an extensible set of tools is provided, i.e. new tools can be created to manipulate image file 220.

The mount tool 250 is used to initiate a sequence that permits the operating system 202 to interact with the image file 220 as if the image file 220 is a storage media volume. The mount tool 250 cooperates with operating system components, such as image driver 210 and file system driver 208 to provide an addressable drive letter mount point for the image file 220 thereby creating a virtual storage media. After the mount tool 250 executes, the operating system can read data from and write data to the image file 220. The mount tool is initiated by any application, user interface, system resource, or command line request. For example, the mount tool is initiated during a boot sequence thereby permitting the computer 200 to boot from the image file 220.

Figure 3:
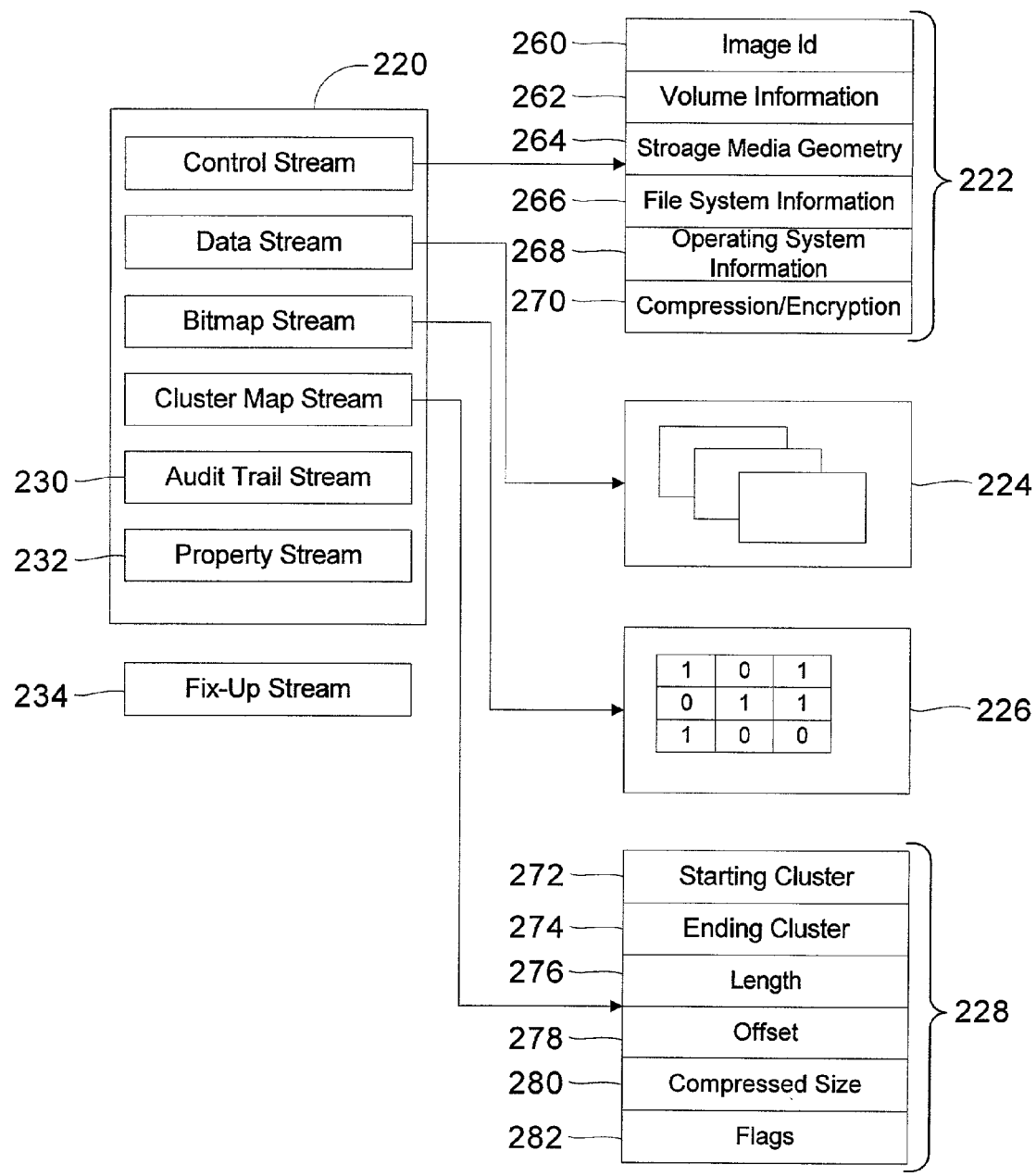
FIG. 3 is a block diagram of an image file format used with the present invention.

FIG. 3 shows an embodiment of the image file 220 used by the present invention. The image file 220 includes the control stream 222, the data stream 224, the bitmap stream 226, the cluster map stream 228, the audit trail stream 230, the property stream 232 and the fix-up stream 234. As previously described, the audit trail stream 230 and the property stream 232 are optional and implemented to provide additional functionality to the image file 220. The fix-up stream 234 is temporary and used to modify other image files streams before they are written to image file 220 on the destination storage media 206.

The control stream 222 is a data structure that functions as a header describing attributes of the image file 220 needed to open and interpret other data included in the image file 220. Data in the control stream includes an image identification 260, volume information 262, storage media geometry 264, file system information 266, operating system information 268, and compression information 270.

The image identification 260 is data that uniquely identifies the image and also data that identifies a size in bytes of the control stream 222. The volume information 262 includes data that defines the source storage media volume 214. Data in the volume information 262 includes a volume offset from the beginning of the storage media 204, a length of the volume, number of hidden sectors on the volume, a volume number, and the type of file system used by the volume.

The storage media geometry 264 includes data that describes physical attributes of the source storage media 264 including the number of cylinders, the number of tracks per cylinder, and the number of sectors per track. The file system information 266 includes data that identifies the total number of clusters, bytes per cluster, and number of clusters per record.

The operating system information 268 includes data that identifies an operating system version that is stored as part of source data 218. The operating system information 268 also includes data that identifies any updates made to the operating system such as service pack identification. A service pack is an update to a software program that fixes known problems with the software program or that provides enhancements to the software program. The service pack identification identifies any service packs stored on the source storage media volume 214 for the operating system files 236. The compression/encryption information includes data that identifies whether the image file is compressed and whether the image file 220 is encrypted.

The data stream 224 includes the source data 218 from the source storage media volume 214. As previously described, the source data 218 includes the data for stored files on the source storage media volume 214. The data for each file is optionally compressed or encrypted using known methods. The decision to compress or encrypt data is made on a file by file basis. Thus, some data in the data stream 224 may be compressed while other data is not. Similarly, some data in the data stream 224 may be encrypted while other data is not. The control information 242 that forms part of the source data 218 also comprises a file and is stored as part of the data stream 224.

In an embodiment of the invention, the data stream 224 does not include multiple copies of identical data. For example, if multiple copies of the same data file 240 are stored on the source storage media volume 214, only one copy of the data file 240 is stored in the data stream 224. Paged memory 244 also need not be included in the data stream 224. When the image file 220 is restored on a storage media volume, the operating system 220 creates paged memory 244 on the storage media volume as needed. Eliminating multiple copies of data and paged memory files reduces the size of image file 220.

The cluster map stream 228 includes a plurality of records and each record identifies a virtual cluster location and a data stream location. The virtual cluster location in each record includes a starting cluster 272 and an ending cluster 274. The starting cluster 272 and the ending cluster 274 identify a set of contiguous clusters where a set of the source data belongs when restored to a storage media volume. The data stream location includes the offset 278, the length 276, and the compressed size 280 and identifies where the set of data exists within the data stream 224. The offset 278 identifies a starting location of the data in the data stream 224, as measured from the beginning of the data stream. For compressed files, length of the set of data in the image file 220 is equal to the compressed size 280. For uncompressed data, the length of the set of data in the image file 220 is the product of the length 276 and the number of bytes per cluster, as identified in the control stream 222. The flag field 282 identifies whether the data in the image file 220 is compressed or uncompressed. The records in the cluster map stream 228 allow the image file 220 to be viewed as a virtual storage media volume and data within the data stream 224 to be read, edited or otherwise manipulated.

Figure 4:
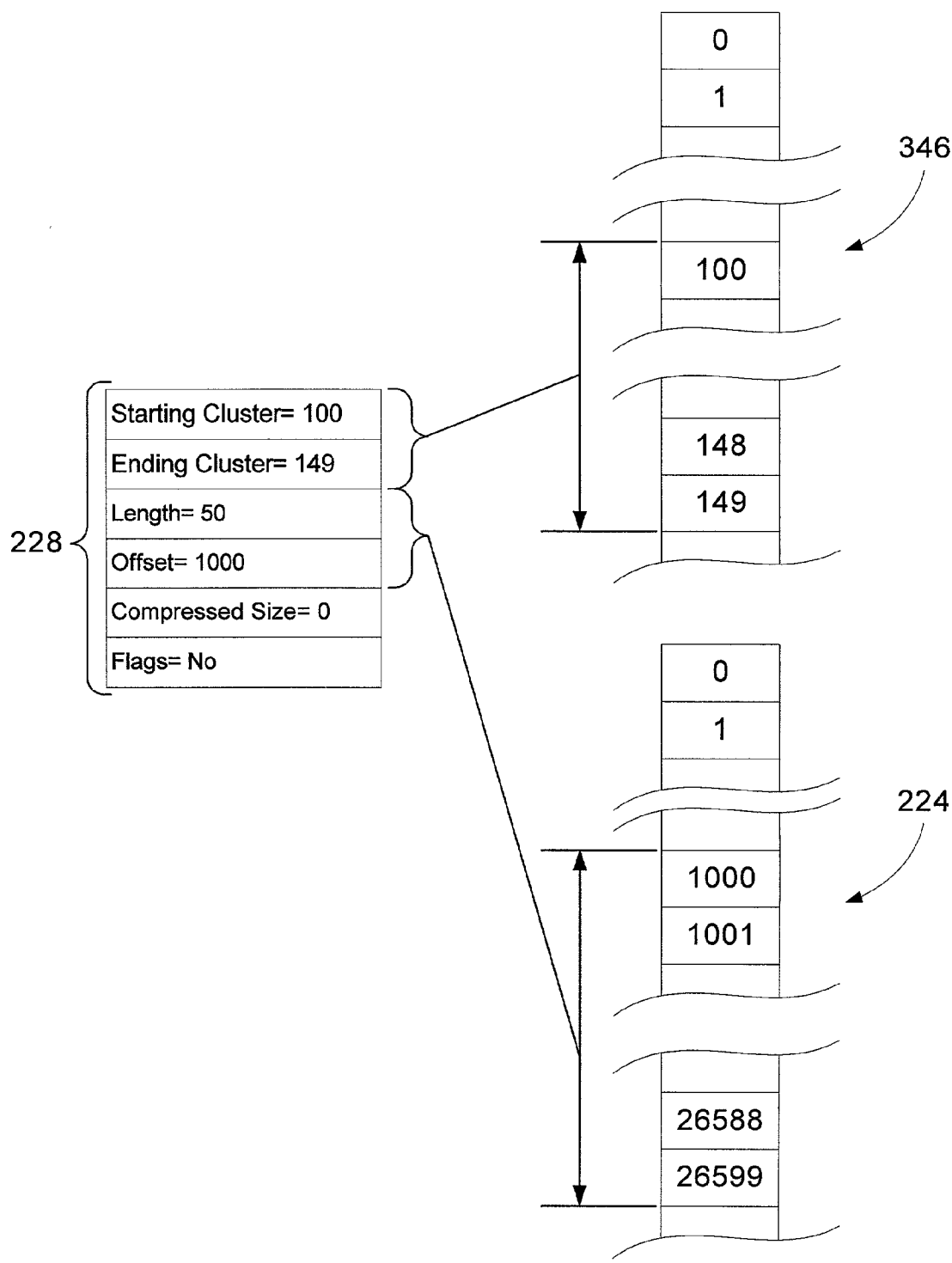
FIG. 4 is a block diagram of a cluster stream used with the present invention.

FIG. 4 illustrates an example of how the location of data in the data stream correlates to a virtual cluster location. The virtual cluster location corresponds the clusters where the data will be placed on a storage media when the image file is restored onto the volume. In FIG. 4, it is assumed that the bytes per cluster is 512 as identified in the control stream 222. A virtual storage media, labeled 346, includes sequentially numbered blocks. Each block represents one cluster. The data stream 224 also includes sequentially labeled blocks. Each block in the data stream 224 represents a byte in the data stream 224 and the number represents the offset, in bytes, from the beginning of the data stream 224.

The starting cluster field 262 of the cluster map record 228 includes a starting cluster 100 and the ending cluster field 149 includes ending cluster 149. The starting and ending cluster define a set of contiguous blocks were a set of data will be placed when the image file is restored on a storage media; i.e. the virtual cluster location. The offset field has a value of 1000. Accordingly, the data starts at an offset of 1000 bytes from the beginning of the data stream 224. Field 272 indicates that the data is not compressed. Thus, the length of the data in the data stream 224 is the product of length, which is identified as 50 in the length field 266, and the number of bytes per cluster 512 (50 clusters*512 bytes per cluster=25,600 bytes). As shown, the corresponding data in the image file is located at bytes 1000 through 26599 as referenced from the beginning of the data stream 224.

As previously described, source data 218 may be defragmented when the image file 220 is created. In that case, the starting cluster and ending cluster may not correspond to the original location on the source storage media volume 214. Instead, the starting and ending cluster number identify the clusters where the data is stored when the image file 220 is restored to a storage media volume, as represented by virtual storage media 346.

If multiple copies of the same data are stored on the source storage media volume 214, the data is only placed in the data stream 224 one time. Where this occurs, multiple records in the cluster stream 228 are created, one record for each occurrence of the data on the source storage media volume 214. Each record includes the same length 266, offset 262, compressed size 270, and compression 272 fields and thereby point to the same data in the data stream 224. The starting cluster 262 and ending cluster 264 fields are different thereby identifying multiple locations where the data will be stored when the image file is restored to a storage media volume.

Returning to FIG. 3, the bitmap stream 226 is used to identify virtual allocated and unallocated clusters. The virtual allocated clusters are clusters that will include data when the image file is restored to a storage media volume. Virtual unallocated clusters represent clusters that will be available to store new data when the image file is restored to a storage media volume. In the example shown, the bitmap stream is implemented as a bitmap. Each bit in the bitmap corresponds to a cluster. A bit with a value of "1" represents a virtual allocated cluster while a bit with a value of "0" represents a virtual unallocated cluster. The bitmap stream performs the same function as the bitmask 240. However, because the bitmap stream 226 is outside the data stream 224, it is readily accessible within the image file 220. The audit trail stream 230 includes data that identifies any changes made to the image file, the user that initiated the change, the files, if any that were modified, and the date and time that the changes were implemented. The property stream 232 includes data that identifies attributes of the image file 220 such as operating system version. The property stream 232 is queried to identify image files 220 with desired attributes. For example, the property stream 232 is queried to locate images files that include a particular version of the operating system. The audit trail stream and property stream are implemented in any suitable manner.

The fix-up stream is used to modify the image streams after the source data 218 is read by the operating system 202 and before the plurality of streams are written to the image file 220. For example, in the case of the NTFS file system, the fix-up stream modifies the MFT if the files are defragmented when the image file is created.

Figure 5:
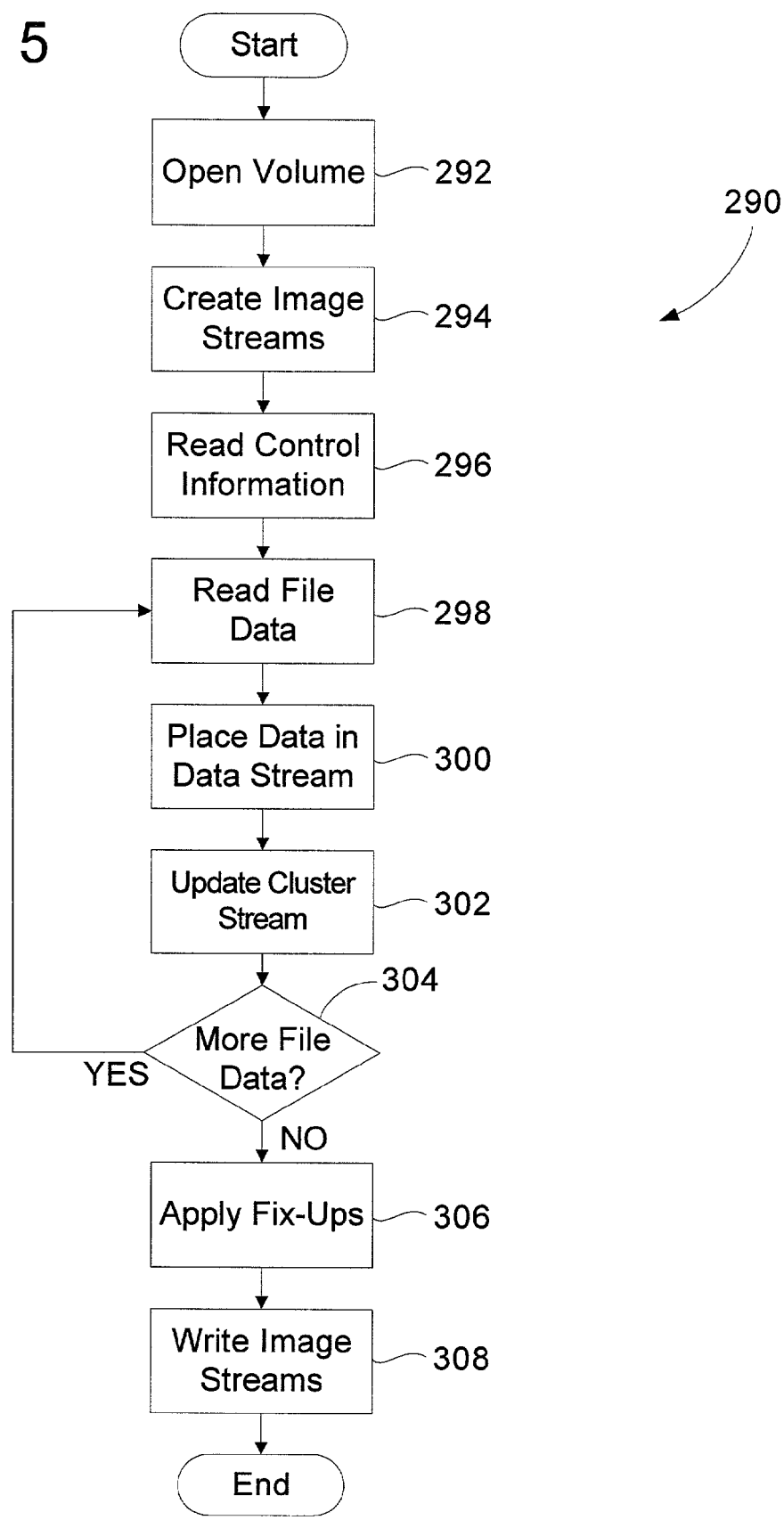
FIG. 5 is a block diagram of a process used to create an image file.

FIG. 5 illustrates processes used to create the image file 220 from the source storage media volume 214. The process 290 may be executed by the operating system 202 such as by a program module operating within image driver 210. Alternatively, the process 290 may be executed in whole or in part by system tools 232, such as capture tool 252.

Typically, the image file 220 is created via a user request from system tools 232. As previously described, the system tools 232 are executed through, or implemented as part of user interfaces, applications, or other program modules. System tools 232 are also executed from a command line request. After the request is received from system tools 232, the operating system 202 opens the source storage media volume 214 as shown in step 292. To open the source storage media volume 214, the image driver 210 obtains a reference to the source storage media volume 214 via file system driver 208. Once the reference to the storage media volume 214 is obtained, the operating system 202 communicates with the storage media 214 via image driver 210 and device driver 212.

In step 294, the process 290 creates the plurality of image streams of the image file 220 including the control stream 222, the data stream 224, the bitmap stream 226, the cluster map stream 228, the audit trail stream 230, the properties stream 232, and the fix-up stream 234. At this point, the plurality of streams comprising the image file 220 may be implemented as in memory structures or, alternatively, may be implemented directly on the destination storage media volume 206.

In step 296, the process 290 reads the control information 242 on the source storage media volume 214. The control information 242 identifies the plurality of files on the source storage media volume 214 and the clusters allocated to each of the files. For example, if the source storage media volume uses the NTFS file system, the process 290 reads the MFT on the storage media volume 214.

In step 298, the process 290 reads the data for a first file identified by the control information 242. In step 300, the process places the data for the file in the data stream 224. As previously described, if multiple copies of the file data exist, the data is only placed in the data stream one time. Additionally, if the file data is part of paged memory 244, it need not be placed in the data stream 224. The data for the file is optionally defragmented when placed into the data stream 224.

In step 302, the cluster stream 228 is updated by adding a record that correlates the virtual cluster location to its data stream location. In step 304, the process 290 determines whether the source storage media volume 214 includes more file data. If more file data exists, the process 290 returns to step 298 and reads the data for the next file.

If no more file data exists, the process 290 proceeds to step 306 and applies fix-ups to the image file streams. The fix-ups are applied to account for data movement. For example, as previously described, the process 290 may defragment the data for the plurality of files on the source storage media 214. Thus, the process 290 modifies the control information 242 located in the data stream 224 so that control information 242 identifies the clusters now allocated to each file. In the case of an NTFS volume, the process corrects the extent list for each file in the MFT. Because the data for each file is defragmented, the extent list for each file includes a single extent. The bitmask 248 is also modified to properly reflect allocated and unallocated clusters in view of changes to data location. Fix-ups are also applied to the BPB 246. Because the location of files referenced in the BPB is changed, the BPB is modified so that the proper location of files is referenced.

Once the process is complete, the control stream 222, data stream 224, bitmap stream 226, cluster map stream 228, audit trail stream 230, and properties stream 232 are written to the destination storage media 206 thereby forming image file 220 as shown in step 308.

Figure 6:
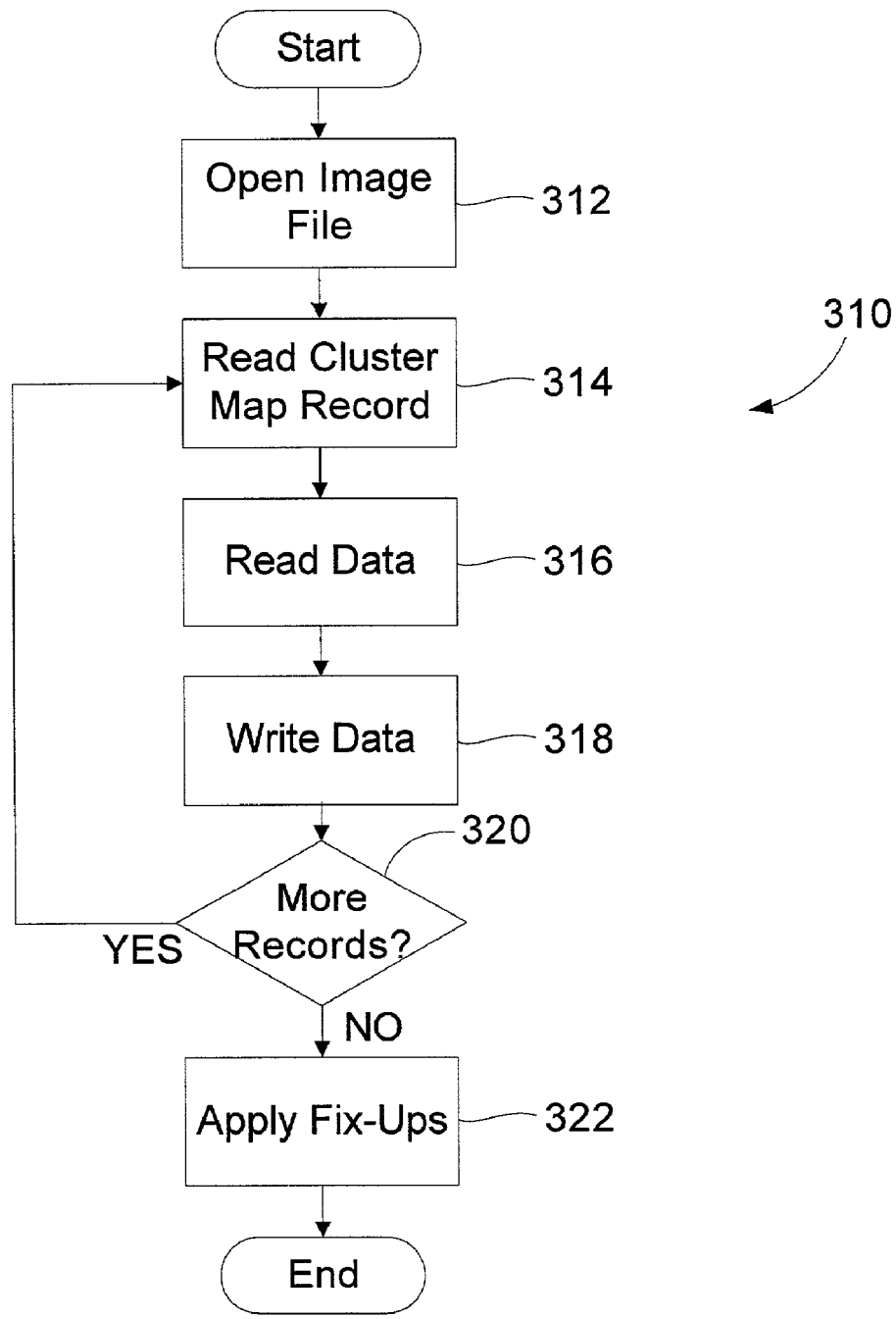
FIG. 6 is a block diagram of a process used to restore an image file.

FIG. 6 shows a process, labeled 310, used to restore the image file 220 to a storage media volume such as source storage media volume 214. The process 310 may be executed by the operating system 202. Alternatively, the process 340 is executed in whole or in part by system tools 232, such as restore tool 254. In step 312, process 310 opens the image file 220 and obtains a reference to the destination storage media volume 206.

In step 314, the process 310 reads one of the plurality of the cluster map records included in the cluster map stream 228. The cluster map record identifies the location in the data stream 224 for data and also identifies the intended location of the data on the source storage media volume 214; i.e. the virtual cluster location. After reading the cluster map record, the data is read from the data stream 224 as shown in step 316. The data is then written to the storage media 214 on the clusters as identified by the starting and ending clusters in the cluster map 228.

In step 320, the process 310 determines if more records exist in the cluster map stream 228. If more records exist, the process returns to step 314 where the next cluster map record is examined. If no more records exist, the process 310 proceeds to step 322 where fix-ups are applied. The fix-ups are required if the geometry between the source storage media volume 214 used to create the image file and the storage media volume where the source data 218 is restored are different. For example, if the location of files identified in the BPB is changed, the BPB is updated to reflect the new location of the files. Also, the BPB includes geometry information of the storage media. The geometry information in the BPB needs to be updated to reflect the actual geometry of the storage media that includes the restored source data 218.

Figure 7:
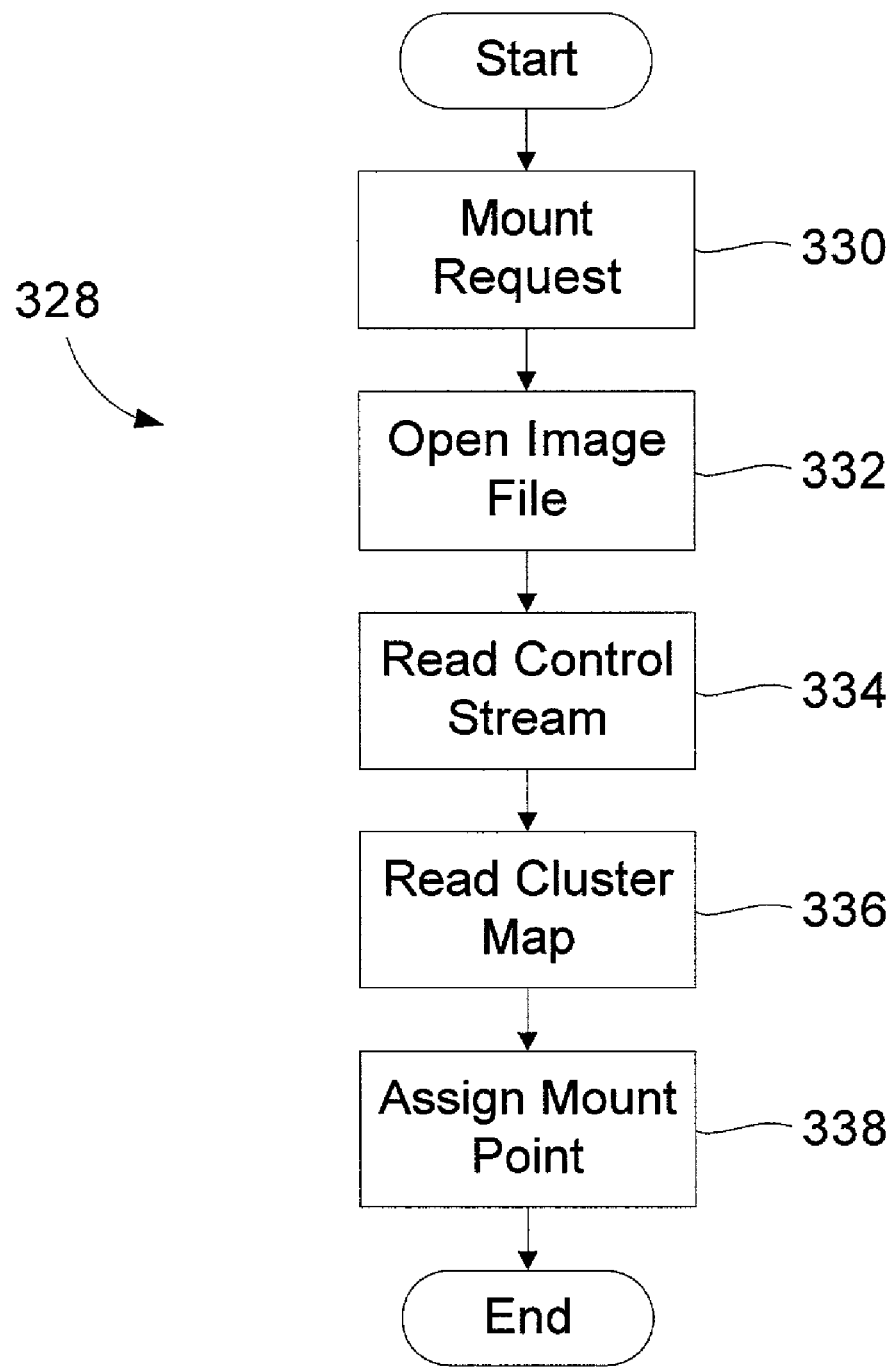
FIG. 7 is a block diagram of a process used to permit access to data in an image file.

FIG. 7 illustrates a process, labeled 328, used to provide access to the image file 220 by the operating system 202. The process 328 is initiated as the result of a user request from mount tool 250. Alternatively, the process 328 is initiated when an application 256 attempts to access image file 220 or when a command line request is received. In step 330, a mount request is received by the image driver 210.

After the image driver 210 receives the mount request, the image driver 210 sends a request to the file system driver 208 to open the image file 220 as shown in step 332.

Opening a file is a standard process employed by the operating system 202 to permit access to a file on storage media. Because the image file 220 is stored as a file on the storage media 206, it must be opened before being accessed.

Once the image file 220 is open, the image driver 210 bypasses the file system driver 208 and directly reads the image file 220. The image driver 210 reads the control stream 222 and the cluster map stream 228 as shown in steps 334 and 336. As previously described, the control stream includes data that identifies the type of file system used to organize the source data 218 and also the geometry of the source storage media 214. The data in the control stream is necessary to interpret the information in the other streams such as data stream 224. The cluster map stream 228 includes the information necessary to correlate virtual cluster locations to the data stream locations.

In step 338, the image driver 210 requests a drive letter mount point assignment for the image file 220. The assignment is carried out by a portion of the operating system 202 responsible for assigning driver letter mount points.

Figure 8:
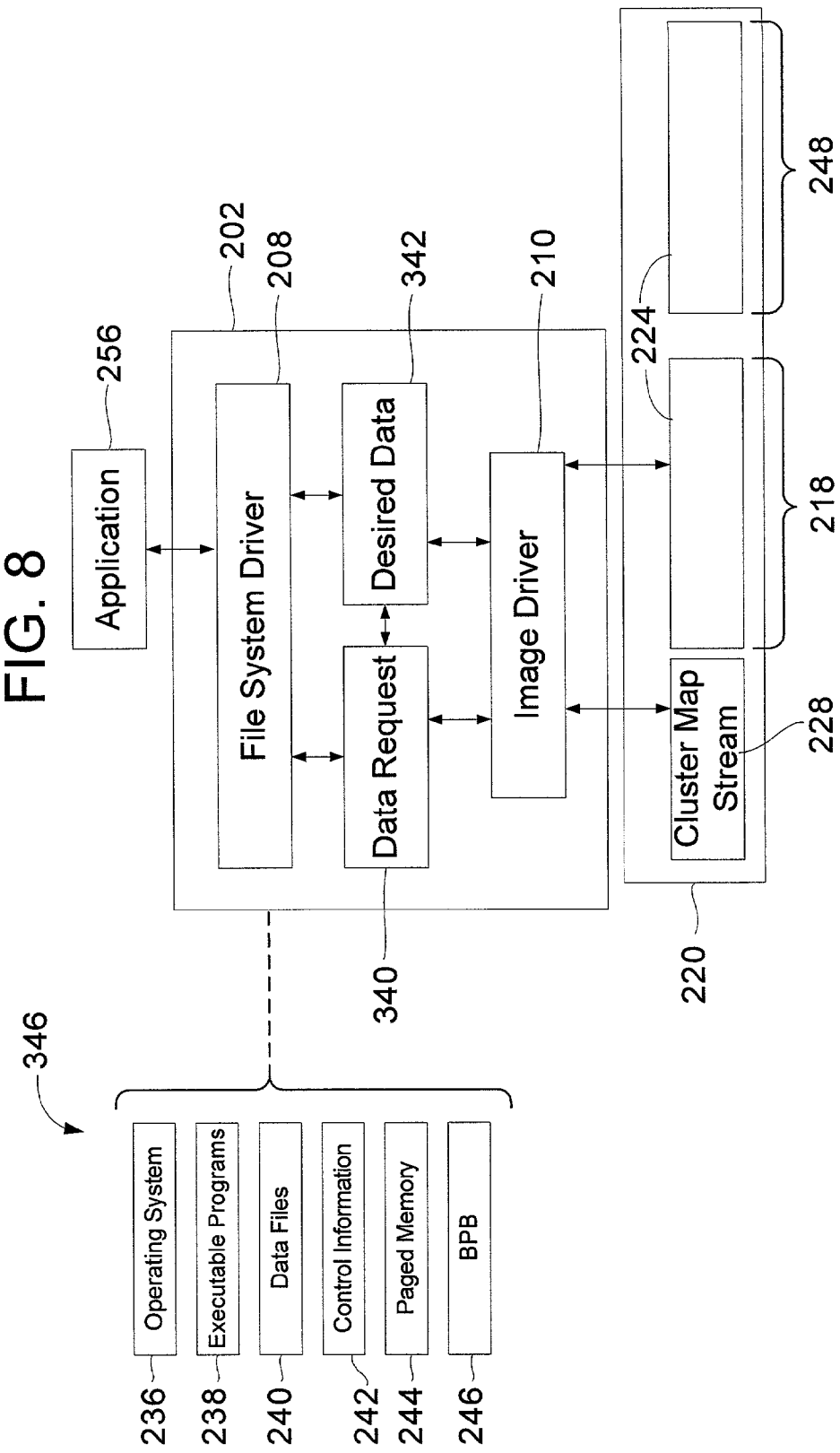
FIG. 8 is a block diagram of an operating environment used to access data in an image file.

FIG. 8 illustrates how the image driver 210 cooperates with the image file 220 to create a virtual storage media volume from the data in the image file 220. Once the image file 220 is mounted, the file system driver 208 accesses the image file 220 as if it is a storage media volume. The image driver 210 operates below the file system driver 208 as shown and translates access requests from the file system driver 208. For simplicity, the device driver 212 is not shown.

By way of example, when the file system driver 208 issues a data request 340 to read data from the image file, it identifies a group of clusters. The clusters correspond to the location where the desired data would reside in restored data 215. Thus, the operating system 202 actually provides a group of virtual clusters. The image driver 210 intercepts the data request 340. The image driver then examines the cluster map stream 228 and locates the record with a starting cluster and ending cluster that correspond to the virtual clusters provided by the file system driver 208. The image driver then locates the desired data within the data stream based on the cluster map record, reads the data from the data stream, and forwards the desired data 342 to the file system driver 208.

The above arrangement permits the operating system to request data from the image file 220 as if it were a storage media volume. Thus, the operating system 202 can read the control information 242, data files 240, executable programs 238 and other data stored in the data stream 224. As a result, the operating system 202 views the image file as a virtual storage media, generally labeled 346. Application 256 can, for example, read data files 240 from the image file 220 via the operating system 202. The application 256 can then edit the data file 240. As another example, storage media resources such as those used to read and display the contents of storage media are used with the image file. The storage media resources display the contents of the image file as if the image file was restored data 215.

Because access of the image file is permitted, the set of available tools are extensible. For example, the interface 232 can form an application programming interface 232 that permits access to the data streams in the image file 220. Thus, the architecture permits new tools to be created to create, restore, view, edit or otherwise manipulate image file 220.

The operating arrangement also permits the image file 220 to be edited. The file system driver 208 sends a data request 340 to write data to a group of clusters. The group of clusters corresponds to a set of virtual unallocated clusters. The image driver 210 intercepts the request and writes the data, labeled 248, to the end of the data stream 224. If the data represents a new file, the image file driver 210 creates a new cluster map record that identifies the virtual cluster location. The cluster map record further includes the data stream location.

If the data represents an edited file, the image driver writes the data to the end of the data stream 224, generally labeled 248. However, a new cluster map 228 record is not created. Instead, the image driver locates the record that identified the previous location of the file data and modifies the record to include the new virtual cluster and data stream locations.

Figure 9:
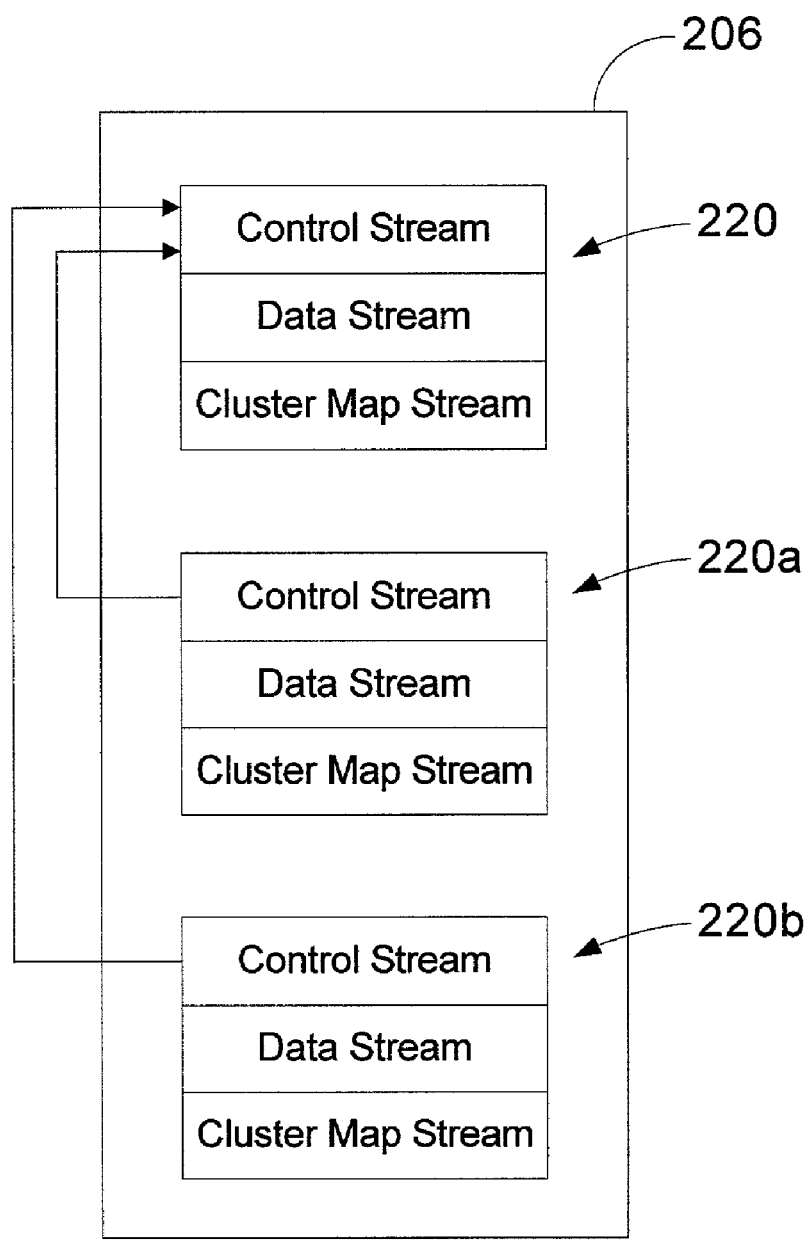
FIG. 9 is a block diagram of multiple related image files.

FIG. 9 illustrates multiple versions of an image file. The parent image file 220 is a capture of source data 218 at a first period of time. As previously described, the control stream includes data that uniquely identifies the image file 220. The child image file 220a is a capture of the source data 218 at a second period of time. However, the data stream and cluster map stream of the child image file 220a only represent data changes made to the source data 218 from the first period time to the second period of time. For example, if new operating system programs 236 are added after the parent image file 220 is made, the child image file 220a only includes the data for the new files. Cluster map records are created in the child file 220a to support the location of the new file data in the data stream and on the disk. The child image file 220a includes data in its control stream that identifies the parent image file 220. Child image file 220c likewise represents the source data 218 at yet a third period of time.

The parent image file 220 and child image files 220a, 220b are stored as separate files. Alternatively, the parent file 220 and child image files 220a, 220b are stored as part of a larger file 206. The advantage of using parent and child image files is that multiple versions of the image are maintained without the need to recreate entire image files. Thus, the overall size of the multiple versions of the image file are reduced.

Figure 10:
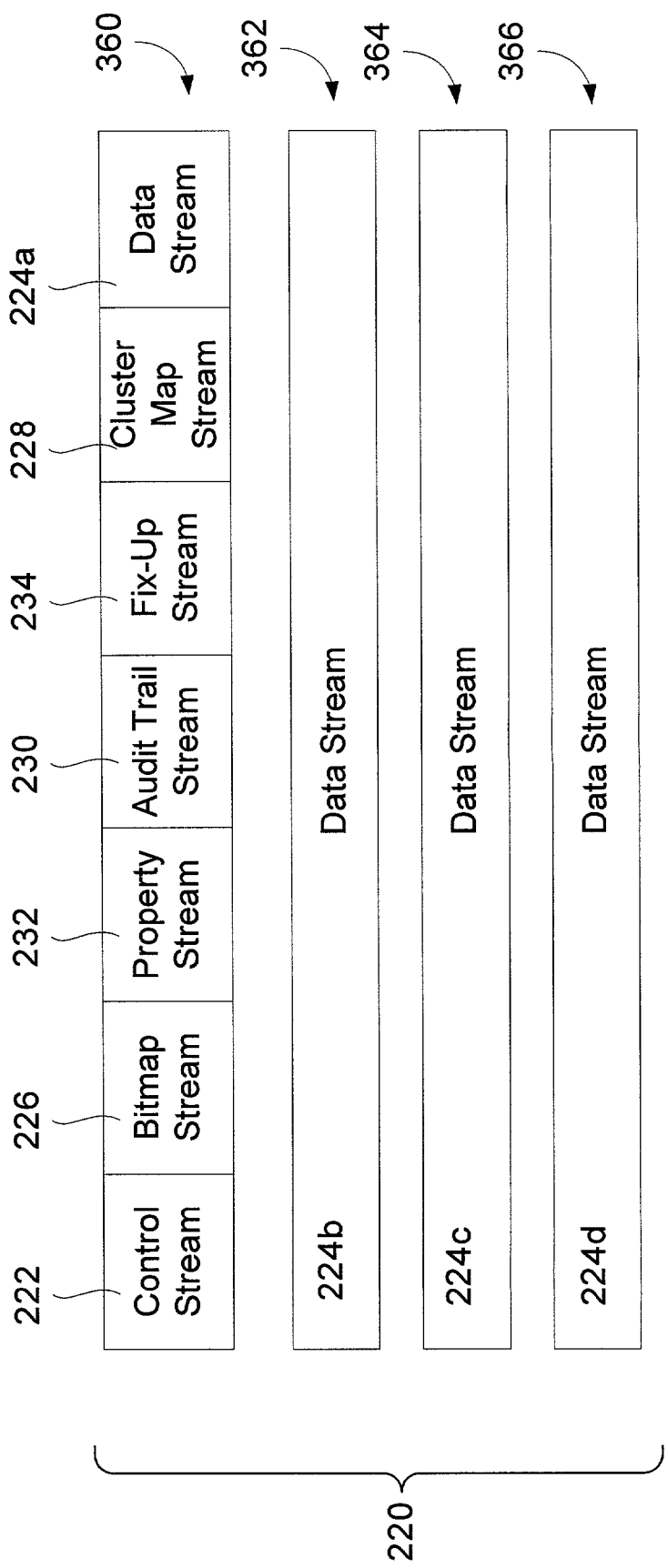
FIG. 10 is a block diagram of a method used to transport image files over media.

FIG. 10 illustrates a method of transporting an image file over a medium such as a network. As shown, the image file 220 is broken into multiple segments 360, 362, 364, 366. Each segment represents a set of data separately transportable over a network. The first segment 360 includes the control stream 222, bitmap stream 226, property stream 232, the audit trail stream 230, the fix-up stream 234, and the cluster map stream 228. The first segment also includes a portion of the data stream, labeled 224a. The remaining segments 362, 363, 364 include other portions of the data stream 224b, 224c, 224d. Collectively, portions 224a, 224b, 224c and 224d form the entire data stream 224.

Each segment 360, 362, 363, 364 is separately transportable over the network. Thus, if a first computer sends the image file 220 to a second computer on the network, and during the process the network connection is lost, the first computer only needs to resend those segments not fully received by the second computer.

All of the references cited herein, including are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for creating an image file from a source storage media volume to a destination storage media volume, comprising:

opening a source storage media volume;

creating a plurality of image streams, the plurality of image streams comprising at least a control stream, a data stream, a bitmap stream and a cluster map stream;

reading control information from the source storage media volume, the control information identifying a plurality of files on the source storage media volume and clusters allocated to each of the plurality of files, wherein the control stream and bitmap stream are populated on the basis of the control information;

retrieving data from each of the plurality of files identified in the control information;

placing the data of each of the plurality of files to the data stream, wherein only one copy of data is placed to the data stream if a plurality of files on source storage media volume contain the same data;

updating, after placing the data of a file to the data stream for each of the plurality of the files, the cluster map stream by adding a record that correlates cluster location of the data of a file in the source storage media volume to its location in the data stream; and writing the control stream, data stream, bitmap stream and cluster map stream to a destination storage media to form an image file.

2. The method of claim 1 further comprising the steps of, editing the data and writing the edited data to the data stream in the image file.

3. The method of claim 2 wherein the edited data is written to the end of the data stream.

4. The method of claim 2, wherein the editing comprising:

creating a cluster map record that maps a virtual location for the edited data in the image file to a location in the data stream; and adding the cluster map record to the cluster map stream.

5. The method of claim 4 wherein the virtual location for the edited data in the image file is determined from a bitmask stream that identifies allocated and unallocated clusters in the image file.

6. The method of claim 1 further comprising the steps of receiving edited data and writing the edited data to the data stream in the image file.

7. The method of claim 6 wherein the edited data is written to the end of the data stream.

8. The method of claim 1, wherein the data in the data stream is compressed.

9. The method of claim 1, wherein the data in the data stream is encrypted.

10. The method of claim 1 wherein the image file further comprises an audit trail stream, further comprising:

creating an audit trait record, the audit trail record identifying a file that includes the set of edited data added to the data stream.

11. A computer-readable medium storing computer executable instructions for a method, comprising:

opening a source storage media volume;

creating a plurality of image streams, the plurality of image streams comprising at least a control stream, a data stream, a bitmap stream and a cluster map stream;

reading control information from the source storage media volume, the control information identifying a plurality of files on the source storage media volume and clusters allocated to each of the plurality of files, wherein the control stream and bitmap stream are populated on the basis of the control information;

retrieving data from each of the plurality of files identified in the control information;

placing the data of each of the plurality of files to the data stream, wherein only one copy of data is placed to the data stream if a plurality of files on source storage media volume contain the same data;

updating, after placing the data of a file to the data stream for each of the plurality of the files, the cluster map stream by adding a record that correlates cluster location of the data of a file in the source storage media volume to its location in the data stream; and writing the control stream, data stream, bitmap stream and cluster map stream to a destination storage media to form an image file.

12. The computer-readable medium of claim 11 wherein the data in a data stream of the image file is compressed.

13. The computer-readable medium of claim 11 wherein the data in a data stream of the image file is encrypted.

14. The computer-readable medium of claim 11 further comprising:

adding a set of edited data to a location in the data stream;

creating a cluster map record, the cluster map record mapping a virtual location for the set of edited data in the image file to the location in the data stream; and adding the cluster map record to the cluster map stream effective to allow the set of edited data of the virtual location to be represented at the image file.

15. The computer-readable medium of claim 11 wherein the image file further comprises an audit trail stream, further comprising:

creating an audit frail record, the audit trail record identifying a file that includes the set of edited data added to the data stream.

* * * * *

UNITED STATES PATENT AND TRADEMARK OFFICE
CERTIFICATE OF CORRECTION

PATENT NO. : 7,334,099 B2
APPLICATION NO. : 10/184257
DATED : February 19, 2008
INVENTOR(S) : Wesley A. Witt et al.

Page 1 of 1

It is certified that error appears in the above-identified patent and that said Letters Patent is hereby corrected as shown below:

In column 16, line 62, in Claim 10, delete "trait" and insert -- trail --, therefor.

In column 18, line 19, in Claim 15, delete "frail" and insert -- trail --, therefor.

Signed and Sealed this
Fifteenth Day of February, 2011

David J. Kappos
*Director of the United States Patent and Trademark Office*